March 11, 1969 — R. C. BUELER — 3,431,730

ADJUSTING MECHANISM

Filed Dec. 22, 1966

INVENTOR
RICHARD C. BUELER
BY Joseph E. Papin

INVENTOR
RICHARD C. BUELER

United States Patent Office 3,431,730
Patented Mar. 11, 1969

3,431,730
ADJUSTING MECHANISM
Richard C. Bueler, Glendale, Mo., assignor to Wagner Electric Corporation, Newark, N.J., a corporation of Delaware
Filed Dec. 22, 1966, Ser. No. 604,061
U.S. Cl. 60—54.6                          17 Claims
Int. Cl. F15b 15/08; F16d 65/72

ABSTRACT OF THE DISCLOSURE

A hydraulic adjusting mechanism for maintaining a predetermined distance between a brake shoe and a brake drum which is provided with an expansible trapped pressure fluid chamber that is supplied additional pressure fluid as the brake lining wears, and the pressure fluid in the expanded chamber serves as a fluid stop to limit the return movement of the brake shoe away from the brake drum to the predetermined distance. The supply of the additional pressure fluid to the expansible chamber is controlled by a valve member which has opposed fluid pressure areas to provide positive movement thereof toward an adjusted position to trap the additional pressure fluid in the expansible chamber and the valve member opens a bypass passage upon the expansion of the chamber beyond a predetermined amount to limit the amount of adjustment of the brake shoe.

Background of the invention

This invention relates to friction devices and more particularly to adjusting mechanisms for friction devices.

In the past, adjusting mechanisms for friction devices have been provided with trapped volume pressure fluid chambers and piston means movable therein for displacing the trapped pressure fluid to actuate the friction device. These adjusting mechanisms provided the piston means with a return movement which allowed a predetermined volume of pressure fluid to return to the trapped chamber, and this volume of pressure fluid returned was equivalent to that required to establish the desired clearance between the brake shoe and drum to maintain the friction device in adjustment. When the desired clearance between the brake shoe and drum was exceeded due to wear of the lining on the shoe, additional pressure fluid was supplied to the trapped chamber to move the shoe into engagement with the drum, and since the return movement of the piston means trapped this additional pressure fluid in the chamber and permitted only the return of the predetermined volume of pressure fluid, the additional pressure fluid maintained the brake shoe in a new position to automatically adjust the friction device and provide the desired clearance between the brake shoe and drum. However, these prior art adjusting mechanisms made no provision for the positive return movement of the piston means to its adjusted position to trap the additional pressure fluid in the chamber, but instead relied upon a pressure differential drop caused by fluid flow around the piston means to move the piston means in the return direction.

Summary

It is therefore the principal object of the present invention to provide a novel adjusting mechanism having piston means therein controlling pressure fluid flow into an expansible chamber, and said piston means is positively returned to its adjusted position in response to fluid pressure acting thereon to trap the fluid pressure in said expansible chamber.

Another object of the present invention is to provide a novel adjusting mechanism in a vehicle braking system which automatically maintains the proper clearance between the brake shoes and drum of a vehicle.

Another object of the present invention is to provide an adjusting mechanism having an expansible chamber therein which serves as a liquid stop for the return movement of the brake shoes, and means in said adjusting mechanism provided with differential areas responsive to fluid pressure to provide positive movement of said means to its adjusted position to trap additional pressure fluid in said expansible chamber as the lining on the brake shoe wears.

Another object of the present invention is to provide an adjusting mechanism having means therein for automatically maintaining the proper clearance between the brake shoes and drum of a vehicle and having other means therein for disabling said first named means upon the adjustment of said brake shoes beyond a predetermined value.

Still another object of the present invention is to provide an adjusting mechanism having an expansible trapped fluid pressure chamber therein, and means in said adjusting mechanism controlling pressure fluid flow into said expansible chamber, said adjusting mechanism having a bypass passage therein to limit the expansion of said expansible chamber to a predetermined value.

Still another object of the present invention is to provide an adjusting mechanism of simplified construction for economy of manufacture.

These and other objects and advantages of the present invention will become apparent hereinafter.

Briefly, the present invention comprises an adjusting mechanism for a friction device having a pair of expansible chambers therein and means movable in said adjusting mechanism having opposed differential areas thereon and controlling pressure fluid communication between said chambers, said means being movable in response to the expansion of one of said chambers in excess of a predetermined amount to connect said chambers in pressure fluid communication and said means being movable in response to the fluid pressure in said chambers acting on said opposed differential areas thereof toward a position interrupting pressure fluid communication between said chambers.

Brief description of the drawings

In the drawings which illustrate embodiments of the present invention.

Description of the preferred embodiments

Figure 1:
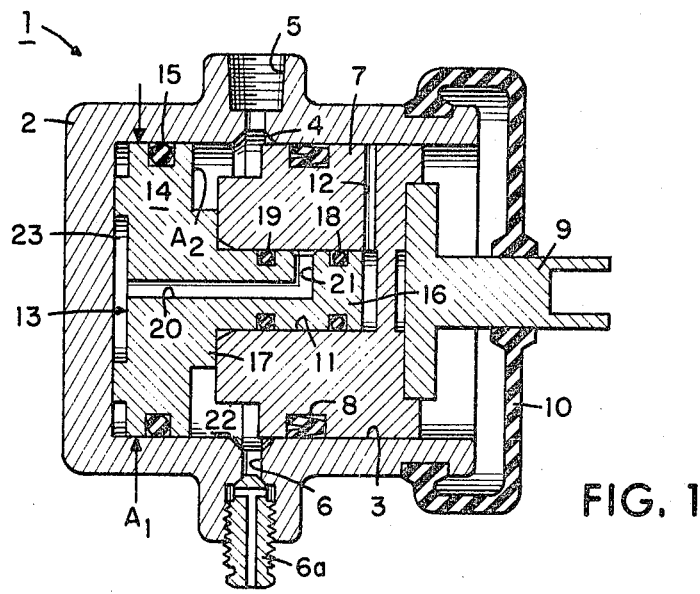
FIG. 1 is a sectional view showing the adjusting mechanism in cross-section.

Referring now to FIG. 1, an adjusting mechanism 1 is provided with a housing 2 having a bore 3 therein, and an undercut 4 is provided in the bore 3 adjacent the midportion thereof. An inlet port 5 for connection with a fluid pressure generating means is provided in said housing connecting with the undercut 4, and another bore 6 is provided in the housing 2 connecting with the undercut 4 in the bore 3. A bleed screw 6a is threadedly received in the bore 6. A slave or actuating piston 7 is provided in the rightward end of the bore 3 having a seal 8 thereon for slidable sealing engagement with said bore, and a push rod 9 is provided on the rightward end of said piston extending through a boot 10 on the rightward end of the housing 2 for connection with a brake shoe (not shown). An axially extending bore 11 is provided in the leftward end of the actuating piston 7, and a radially extending venting passage 12 is provided in said actuating piston connecting with the rightward end of said bore.

An adjusting or compensating piston, indicated generally at 13, is provided with a body portion 14 having a peripheral seal 15 thereon for sealing engagement with the bore 3, and a sleeve portion 16 extends rightwardly therefrom into the bore 11 of the actuating piston 7. An abutment or shoulder 17 is provided on the adjusting piston 13 at the intersection of the body and sleeve portions 14, 16 for displacement preventing engagement with the leftward end of the actuating piston 7, and a seal 18 is provided on the sleeve portion 16 adjacent the rightward end thereof for slidable sealing engagement with the bore 11. Another seal or valve member 19 is provided on the sleeve portion 16 for sealing engagement with the bore 11, and said valve member is spaced a predetermined distance from the abutment 17. The leftward end of the body portion 14 is provided with an effective fluid pressure responsive area $A_1$ which is proportionally larger than the effective fluid pressure responsive area $A_2$ provided on the rightward end of the body portion 14 across the seal 15 minus the effective area of the sleeve portion 16 across the seal 18. An axially extending passage 20 is provided in the adjusting piston 13 having one end thereof extending through the leftward end of the body portion 14 and the other end thereof connecting with a radially extending passage 21 provided in the sleeve portion 16 between the seals 18 and 19.

To complete the description of the adjusting mechanism 1, it should be noted that an expansible input fluid pressure chamber 22 is defined in the bore 3 between the rightward end of the body portion 14 and the leftward end of the actuating piston 7 in open pressure fluid communication with the inlet port 5, and an expansible trapped pressure fluid chamber 23 is defined in the bore 3 between the leftward end of the body portion 14 and an end wall of the housing 2. Also, it should be noted that a pressure fluid flow passage for connecting the input and trapped pressure fluid chambers 22, 23 is provided by the axial and radial passages 20, 21 and pressure fluid flow therethrough is controlled by the valve member 19.

In the operation of the adjusting mechanism 1 with the component parts thereof in their normal positions, as shown in FIG. 1 and as hereinabove described, it should be understood that the movement of the actuating piston 7 in the rightward or actuating direction determines the distance that the brake shoe is moved during a braking application, and the distance said actuating piston is permitted to move in the leftward or return direction determines the space established between the brake shoe and the brake drum. Therefore, when the return spring of the brake assembly (not shown) has moved the actuating piston 7 leftwardly into engagement with the abutment 17 on the adjusting piston 13 and moved said adjusting piston into engagement with the end wall of the housing 2, the brake shoe connected to the push rod 9 is in a position predeterminately spaced from the brake drum. Should the operator desire to make a braking application, a force is supplied to the fluid pressure generating means to apply fluid pressure through the inlet port 4 and into the input chamber 22. The applied fluid pressure in the input chamber 22 acts on the effective area $A_2$ on the adjusting piston 13 to maintain the leftward end thereof in abutting engagement with the end wall of the housing 2 and also acts on the leftward end of the actuating piston 7 to urge the push rod 9 and the brake shoe associated therewith rightwardly relative to said adjusting piston to engage the brake shoe with the brake drum to effect the braking application.

A release of the brakes is effected by the exhaustion of the applied fluid pressure in the input chamber 22 which enables the return spring of the brake assembly to move the brake shoe and push rod 9 leftwardly, thereby moving the actuating piston 7 leftwardly, and the return movement of said actuating piston is limited by its abutting engagement with the abutment 17 and the brake shoe is moved away from the brake drum the predetermined distance which is equivalent to the return movement of said actuating piston.

If during a braking application the lining on the brake shoe should become worn so that additional movement thereof is required to effect the braking application, further rightward movement of the actuating piston 7 will be required and, as previously described, the fluid pressure in the input chamber 22 will urge said actuating piston rightwardly relative to the adjusting piston 13. When the input chamber 22 is expanded beyond a predetermined value, the actuating piston 7 has moved rightwardly to a position disengaging the valve member 19 from the bore 11, and establishing pressure fluid communication between the input and trapped chambers 22, 23 through the radially and axially extending passages 21, 20. The fluid pressure in the trapped chamber 23 acts on the effective fluid pressure responsive area $A_1$ to establish a force $F_1$ on the adjusting piston 13 in opposition to a force $F_2$ thereon established by the fluid pressure in the input chamber 22 acting on the effective fluid pressure responsive area $A_2$. Since the effective fluid pressure responsive area $A_1$ is proportionally larger than the effective fluid pressure responsive area $A_2$, the force $F_1$ overcomes the force $F_2$ and the adjusting piston 13 is urged rightwardly to provide positive movement of said adjusting piston in its adjusting direction. This movement of the adjusting piston 13 in its adjusting direction serves to re-engage the valve member 19 with the bore 11 and interrupt pressure fluid communication between the input and trapped fluid pressure chambers 22 and 23 and also serves to trap a volume of pressure fluid in the chamber 23. This trapped volume of pressure fluid in the chamber 23 is substantially incompressible so that said chamber is expanded and the adjusting piston 13 is not able to move leftwardly and is maintained in its adjusted position.

When the desired braking effect is obtained and the applied fluid pressure in the input chamber 22 is exhausted, the return spring of the brake assembly is effective to move the brake shoe and push rod 9 leftwardly, which serves to move the actuating piston 7 leftwardly. With the adjusting piston 13 moved rightwardly to its adjusted position, the return movement of the actuating piston 7 is restricted or limited to a predetermined value which is equivalent to the distance between the position where the valve member 19 has re-engaged the leftward end of the bore 11 and the position where the leftward end of said actuating piston engages the abutment 17, and this predetermined value is determined by said valve member being spaced the predetermined distance from said abutment. The return movement of the actuating piston 7 is thereby reduced since it is limited to this predetermined value, and the distance the brake shoe is permitted to move away from the brake drum is correspondingly reduced to the predetermined value. Thereafter, the distance maintained between the brake shoe and drum will be substantially equivalent to the predetermined value because the radially and axially extending passages 21, 20 will be opened and closed as hereinabove described to increase the volume of pressure fluid trapped in the chamber 23 as the lining wears so that the adjusting piston 13 will be urged rightwardly to its adjusted position and the return movement of the actuating piston 7 will be limited as hereinabove described.

Each time the brake shoe is being adjusted, the adjusting piston 13 is moved rightwardly, and when the brake shoe has been adjusted a predetermined amount, the seal 15 on said adjusting piston is moved to a position poised on the leftward edge of the undercut 4. Thereafter, when a braking application is made and the input chamber 22 is expanded beyond the predetermined value to establish pressure fluid communication between the chambers 22, 23, as previously described, the fluid pressure in the chamber 23 acting on the effective area $A_1$ urges the piston 13 rightwardly to disengage the seal 15 from the bore 3. With the seal 15 disengaged from the bore 3, the undercut 4 serves as a bypass passage to connect the chambers 22, 23 in pressure fluid communication and the force of the fluid pressure acting on the piston 13 moves it to a position with the abutment 17 hereon engaging the leftward end of the actuating piston 7. When the brakes are released and pressure fluid is exhausted from the input chamber 22, the force of the shoe return spring serves to concertedly move the actuating and adjusting pistons 7, 13 leftwardly and re-engages the seal 15 with the bore 3 to interrupt pressure fluid flow through the bypass passage 4. This return movement of the actuating and adjusting pistons 7, 13 to re-engage the seal 15 with the bore 3 serves to trap a volume of pressure fluid in the chamber 23 which is substantially equivalent to the volume of pressure fluid trapped in said chamber when the brake shoe is adjusted the predetermined amount. Since the volume of pressure fluid trapped in the chamber 23 cannot be increased because of the opening bypass passage 4, as hereinabove described, the adjusting piston 13 is disabled or inoperative to move the brake shoe to another adjusted position. Thereafter, each time a braking application is made, additional pressure fluid will be required to move the actuating piston in its actuating direction to effect the braking application. Therefore, the operator will be required to increase the brake pedal stroke to displace this additional pressure fluid from the fluid pressure generating means and in this manner will be made aware that the brake linings have become worn in excess of a predetermined amount.

Figure 2:
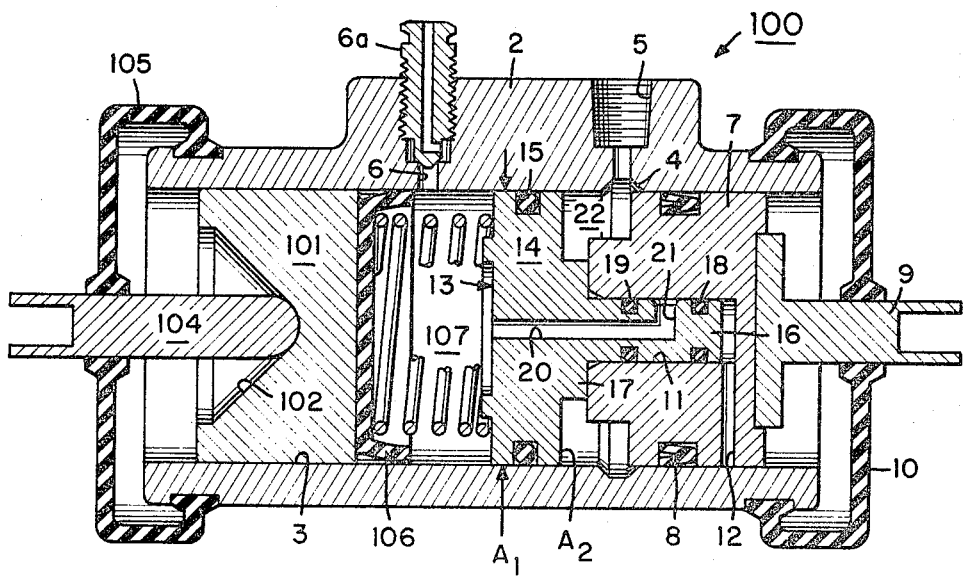
FIGS. 2 through 4 are sectional views showing other embodiments of the present invention.

Referring now to FIG. 2, an adjusting macahanism 100 shown therein is provided with substantially the same component parts and functions in substantially the same manner as the previously described adjusting mechanism 1 with the following exceptions.

Another slave or actuating piston 101 is provided in the leftward end of the bore 3 having a recess 102 therein for receiving one end of a push rod 104, and the other end of said push rod extends through a boot 105 provided on the leftward end of the housing 2 for connection with another brake shoe (not shown). A cup 106 is provided in the bore 3 for sealing engagement with the rightward end of the actuating piston 101 and a trapped fluid pressure chamber 107 is defined in the bore 3 between said cup and the leftward end of the adjusting piston 13.

In the operation of the adjusting mechanism 100 when the operator desires to effect a braking application, applied fluid pressure is supplied to the input chamber 22 which serves to move the actuating piston 7 rightwardly to actuate the brake shoe associated with the push rod 9, as previously described, and the applied fluid pressure acts on the effective area $A_2$ to urge the adjusting piston 13 leftwardly relative to said actuating piston. The leftward movement of the adjusting piston 13 displaces or moves the pressure fluid trapped in the chamber 107 leftwardly, and this displaced pressure fluid serves to move the actuating piston 101 leftwardly to actuate the brake shoe associated with the push rod 104.

If the lining on either brake shoe should become worn during a braking application so that the input chamber 22 is expanded beyond a predetermined amount, the relative movement of the actuating and adjusting pistons 7, 13 is sufficient to disengage the seal 19 from the bore 11, and the input and trapped fluid pressure chambers 22, 107 are connected in pressure fluid communication by the axial and radial passages 20, 21 to supply additional pressure fluid to the trapped fluid pressure chamber 107.

The increase in fluid pressure and expansion of chamber 107 results in an increase in the distance between the actuating pistons 101, 7 to move the brake shoes connected therewith into engagement with the brake drum, and the additional fluid pressure in the chamber 107 acts on the effective area $A_1$ of the adjusting piston 13 which, due to the relationship of the areas $A_1:A_2$, provides positive movement of said adjusting piston rightwardly toward its adjusted position with the valve member 19 re-engaging the bore 11, as previously described. Due to the expansion of the chamber 107, the return movement of the actuating piston 7 and adjusting piston 13 is limited to the predetermined distance between the valve member 19 and the abutment 17, as previously described, and the brake shoes may be moved away from the brake drum only by this predetermined distance and thereafter said brake shoes will be maintained the predetermined distance from the brake drum as the lining on said shoes becomes worn.

Figure 3:
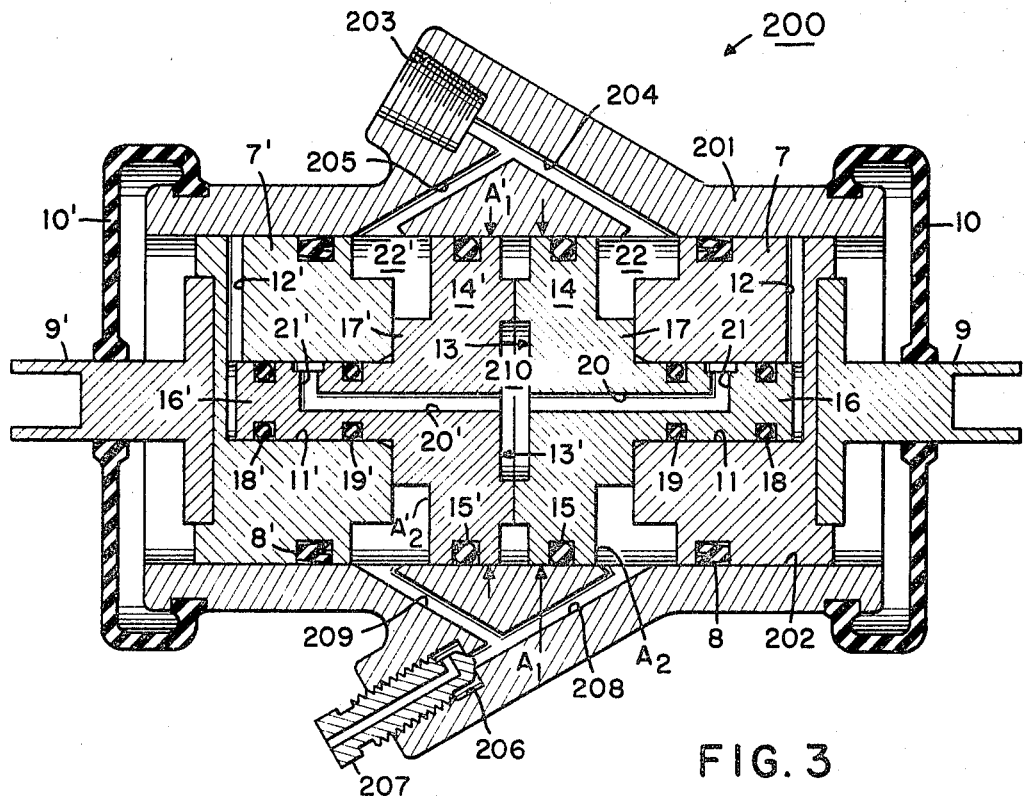

Referring now to FIG. 3, an adjusting mechanism 200 shown therein is provided with substantially the same component parts and functions in substantially the same manner as the previously described adjusting mechanisms 1 and 100 with the following exceptions.

The adjusting mechanism 200 is provided with a housing 201 having a bore 202 therethrough, and an inlet port 203 is provided in the housing 201 adjacent the midportion thereof which separates into two inlet passages 204, 205 connecting with the bore 202. Another bore 206 is provided in the housing 201 adjacent the midportion thereof having a bleed screw 207 threadedly received therein, and said bore separates into two bleed passages 208, 209 connecting with the bore 202.

The actuating and adjusting pistons 7, 13 are provided in the rightward end of the bore 202, and the input chamber 22 is in open pressure fluid communication with the inlet passage 204 and the bleed passage 208. Other actuating and adjusting pistons 7', 13', which are identical to and function in the same manner as the actuating and adjusting pistons 7, 13, are provided in the leftward end of the bore 202, and the input chamber 22' is in open pressure fluid communication with the inlet passage 205 and the bleed passage 209. An expansible or trapped fluid pressure chamber 210 is defined in the bore 202 between the rightward end of the adjusting piston 13' and the leftward end of the adjusting piston 13.

In the operation of the adjusting mechanism 200, fluid pressure is applied through the input port 203 to the input chambers 22, 22' to urge the actuating pistons 13, 13' to actuate the brake shoes associated with the push rods 9 and 9', as previously described. If the brake linings become worn, the input chambers 22, 22' are expanded beyond the predetermined value, as hereinabove described, to connect the trapped fluid pressure chamber 210 with said input chambers through the radial and axial passages 20, 20' and 21, 21', respectively, to increase the fluid pressure trapped in the chamber 210. Since the effective areas $A_1$, $A_1'$ and $A_2$, $A_2'$ on the adjusting pistons 13, 13' provide positive movement thereof to their adjusted positions, the return movement of the actuating pistons 7, 7' are limited to the predetermined distance between the valve members 19, 19' and the abutment 17, 17', as previously described. Therefore, as the lining wears, additional pressure fluid is supplied to the trapped chamber 210 to permit the brake shoes to be moved into engagement with the drum, and this additional pressure fluid is effective to provide positive movement of the adjusting pistons 13, 13' to their adjusted positions to limit the return movement of the brake shoes to the predetermined distance.

Figure 4:
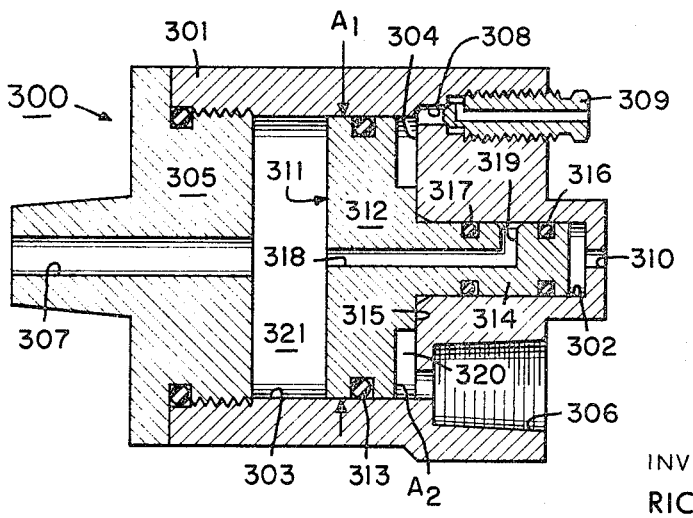

Referring now to FIG. 4, another embodiment of the adjusting mechanism 300 is shown which may be included in a fluid pressure system between a fluid pressure generating means and a friction device operating mechanism. The adjusting mechanism 300 is provided with a housing 301 having an axially aligned bore and counterbore 302, 303 therein, and a radial shoulder or abutment 304 is provided at the intersection of said bore and counterbore. The rightward end of the counterbore 303 is closed by a plug member 305 which is threadedly received therein. An inlet port 306 which connects with the fluid pressure generating means (not shown) is provided in the housing 301 connecting with the rightward end of the counterbore 303, and an outlet port 307 which connects with the friction device operating mechanism (not shown) is provided in the plug member 305 connecting with the leftward end of the counterbore 303. Another bore 308 is provided in the housing 301 connecting with the rightward end of the counterbore 303 having a bleed screw 309 threadedly received therein, and a venting passage 310 is provided in the housing connecting with the rightward end of the bore 302.

An adjusting or compensating piston, indicated generally at 311, is provided with a body portion 312 having a peripheral seal 313 thereon for sealing engagement with the counterbore 303, and a sleeve 314 extends rightwardly therefrom into the bore 302. An abutment or shoulder 315 is provided on the adjusting piston 311 at the intersection of the body and sleeve portions 312, 314 for displacement preventing engagement with the shoulder 304 on the housing 301, and a seal 316 is provided on the sleeve portion 314 adjacent the rightward end thereof for sliding sealing engagement with the bore 302. Another seal or valve member 317 is provided on the sleeve portion 314 adjacent the mid-portion thereof for sealing engagement with the bore 302, and said valve member is spaced a predetermined distance from the abutment 315 on the adjusting piston 311. The leftward end of the body portion 312 is provided with an effective fluid pressure responsive area $A_1$ which is proportionally larger than the effective fluid pressure responsive area $A_2$ provided on the rightward end of the body portion 312 across the seal 313 minus the area of the sleeve portion 314 across the seal 316. An axially extending passage 318 is provided in the adjusting piston 311 having one end thereof extending through the leftward end of the body portion 312 and the other end thereof connecting with a radially extending passage 319 provided in the sleeve portion 314 between the seals 316 and 317.

To complete the description of the adjusting mechanism 300, it should be noted that an input fluid pressure chamber 320 is defined in the counterbore 303 between the rightward end of the body portion 312 and the housing shoulder 304 in open pressure fluid communication with the inlet port 306, and an output fluid pressure chamber 321 is defined in the counterbore 303 between the leftward end of the body portion 312 and the plug member 305 in open pressure fluid communication with the outlet port 307. Also, it should be noted that a pressure fluid flow passage is provided through the adjusting piston 311 by the axial and radial passages 318, 319 for connecting the input and output chambers 320, 321 in pressure fluid communication, and pressure fluid flow therethrough is controlled by the valve means 317.

The adjusting mechanism 300 operates substantially in the same manner as the previously described adjusting mechanism 1 with the following exceptions.

The fluid pressure system connected with the outlet port 307 and the output chamber 321 provides a trapped volume of pressure fluid, and when the abutment 315 on the adjusting piston 311 is in engagement with the housing shoulder 304, the volume of pressure fluid trapped therein maintains the friction device in its adjusted condition with the brake shoes (not shown) spaced a predetermined distance from the brake drum (not shown). Applied fluid pressure from the fluid pressure generating means flows into the input chamber 320 and acts on the effective area $A_2$ to urge the adjusting piston 311 leftwardly to displace pressure fluid from the chamber 321. The movement of the adjusting piston 311 in its leftward or pressure fluid displacing direction is effective to displace pressure fluid from the output chamber 321 to move the brake shoes into engagement with the brake drum to effect the brake application and the rightward or return movement of said adjusting piston determines the distance maintained between the brake shoes and drum. If during a braking application the brake linings become sufficiently worn to cause the adjusting piston 311 to be moved leftwardly and disengage the valve member 317 from the bore 302, the passages 318, 319 are opened to provide pressure fluid communication between the input and output chambers 320, 321. Due to the relationship of the areas $A_1:A_2$, the additional fluid pressure in the output chamber 321 serves to positively move the adjusting piston 311 rightwardly to re-engage the valve member 317 with the bore 302 to trap the additional pressure fluid in the output chamber 321, and the return movement of said adjusting piston is limited to the distance between the position where the valve member 317 re-engages the bore 302 and the position where the abutment 315 engages the housing shoulder 304. Therefore, the movement of the adjusting piston 311 supplies additional pressure fluid to the output chamber 321 as the brake lining wears to move the brake shoes outwardly toward the drum, and the return movement of the adjusting piston 311 is limited to the predetermined distance between the valve member 317 and the abutment 315, as hereinabove described, to thereafter limit the movement of said brake shoes away from the brake drum to the predetermined distance.

From the foregoing, it is apparent that a novel adjusting mechanism meeting the objects set out hereinbefore is provided and that changes or modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows.

I claim:

1. An adjusting mechanism comprising a housing, a pair of relatively movable means in said housing and defining therewith opposed fluid pressure chambers, one of said means being movable relative to the other of said means in one direction in response to applied fluid pressure in one of said chambers, third means responsive to the relative movement between said one and other means in excess of a predetermined value for connecting said chambers in pressure fluid communication, and opposed differential areas on said other means respectively subjected to fluid pressure in said chambers, said other means also being thereafter relatively movable in the one direction in response to the fluid pressure in said chambers acting on said opposed differential areas upon the actuation of said third means to reduce the relative movement of said first means in the direction opposite to the one direction to another predetermined value less than the first named predetermined value upon the elimination of the applied fluid pressure in said one chamber.

2. An adjusting mechanism for a friction device comprising a housing, piston means movable in said housing in actuating and return directions, adjusting means movable in said housing and defining therewith and with said piston means opposed fluid pressure chambers, said piston means being abuttingly engageable with said adjustment means to limit the movement of said piston means in the return direction, said piston means being movable in the actuating direction in response to applied fluid pressure in one of said chambers, other means for connecting said chambers in pressure fluid communication upon movement of said piston means in the actuating direction in excess of a predetermined value to increase the fluid pressure in the other of said chambers, and opposed differential areas on said adjusting means respectively responsive to fluid pressure in said chambers, said differential areas providing positive movement of said adjusting means in the actuating direction to interrupt pressure fluid communication between said chambers through said other means to retain the increased pressure fluid in said other chamber and to reduce the movement of said piston means in the return direction required to abuttingly engage said adjusting means, a bore in said piston means, said adjustment means including another piston means having a body portion movable in said housing and a sleeve portion movable in said bore, said other means including passage means in said other piston means for connecting said one and other chambers in pressure fluid communication, and a seal on said other piston means engageable with said bore and controlling pressure fluid communication between said one and other chambers through said passage, said seal being normally in a position engaging said bore to interrupt pressure fluid communication through said passage, said seal being disengaged from said bore to establish pressure fluid communication between said one and other chambers upon the movement of said first named piston means in the actuating direction in excess of the predetermined value and said seal being movable toward the position engaging said bore to interrupt pressure fluid communication through said passage and increase the fluid pressure in said other chamber upon the movement of said other piston means in the actuating direction.

3. The adjusting mechanism according to claim 2 wherein said passage means includes an axially extending passage in said other piston means having one end in said body portion connecting with said other chamber and the other end thereof connecting with a radially extending passage in said sleeve portion adjacent to said seal, said seal being disengaged from said bore upon the movement of said first named piston means in the actuating direction in excess of the predetermined value to effect pressure fluid communication between said one chamber and said radially extending passage to establish pressure fluid communication between said one and other chambers through said radially and axially extending passages.

4. The adjusting mechanism according to claim 2 comprising an expansible chamber in said bore between said first named piston means and said sleeve portion of said other piston means, and venting means in said housing and said first named piston means defining another passage connecting said expansible chamber with the atmosphere.

5. An adjusting mechanism for a friction device comprising a housing, an actuating member movable in said housing between a retracted position and a displaced position for energizing said friction device, a pair of fluid pressure chambers in said housing, an adjusting member movable in said housing between said chambers and normally engaged with said actuating member to define the retracted position thereof, one of said chambers being defined in said housing between said adjusting and actuating members, said adjusting and actuating members also defining valve means for controlling pressure fluid communication between said chambers, said actuating member being movable in excess of a predetermined amount toward its displaced position in response to fluid pressure supplied to said one chamber to open said valve means and establish pressure fluid communication between said chambers, and opposed differential areas on said adjusting member for respective subjection to fluid pressure in said chambers, said adjusting means also being movable toward said actuating means in response to fluid pressure in said chambers acting on said differential areas upon the establishment of pressure fluid communication between said chambers to adjustably redefine the retracted position of said actuating member and close said valve means thereby interrupting pressure fluid communication between said chambers.

6. The adjusting mechanism according to claim 5, comprising abutment means on said adjusting means defining the retracted position of said actuating means, said actuating means being engaged with said abutment means in its retracted position and being disengaged therefrom upon movement toward the displaced position.

7. The adjusting mechanism according to claim 5, wherein said adjusting member defines with an end wall of said housing the other of said chambers, the pressure fluid in said other chamber providing a substantially incompressible column to substantially obviate movement of said adjusting member toward said end wall from its adjusted position defining the retracted position of said actuating member in response to the fluid pressure supplied to said one chamber.

8. The adjusting mechanism according to claim 5, comprising another actuating member movable in said housing between a retracted position and a displaced position for energizing said friction device, said adjusting member defining with said other actuating member the other of said chambers, the pressure fluid in said other chamber providing a substantially incompressible column defining with said adjusting member the retracted position of said other actuating member, and said adjusting member being movable in response to the supplied fluid pressure in said one chamber to effect concerted movement of said other actuating member through said column toward its displaced position when said valve means interrupts pressure fluid communication between said chambers.

9. The adjusting mechanism according to claim 5, comprising another actuating member movable in said housing between a retracted position and a displaced position for energizing said friction device, another adjusting member movable in said housing and normally engaged with said other actuating member to define the retracted position thereof, said other adjusting member defining with said first named adjusting member the other of said chambers, a third chamber in said housing between said other actuating and adjusting members, said other actuating and adjusting members defining other valve means for controlling pressure fluid communication between said other and third chambers, said other valve means being opened to establish pressure fluid communication between said other and third chambers upon the movement of said other actuating member in excess of another predetermined amount toward its displaced position in response to fluid pressure supplied to said third chamber, and other opposed differential areas on said other adjusting member for respective subjection to fluid pressure in said other and third chambers, said other adjusting member being movable in response to fluid pressure in said other and third chambers acting on said other differential areas upon the establishment of pressure fluid communication between said other and third chambers in a direction toward said other actuating means to adjustably redefine the retracted position thereof and close said valve means to interrupt the pressure fluid communication between said other and third chambers.

10. The adjusting mechanism according to claim 5, comprising means for limiting the movement of said adjusting member to adjustably redefine the retracted position of said actuating member including an opening in said housing normally communicating with said one chamber and spaced from said adjusting member, said adjusting member being movable toward a position over said opening wherein said opening connects said one chamber in bypass relation with the other of said chambers.

11. The adjusting mechanism according to claim 5, wherein said opposed differential areas include a first area on said adjusting member subjected to the fluid pressure in the other of said chambers, a second area on said adjusting member less than said first area and opposed thereto subjected to the fluid pressure in said one chamber, and a third area on said adjusting member additive to said second area and substantially equal to the difference between said first and second areas subjected at all times to the atmosphere.

12. The adjusting mechanism according to claim 5, wherein said adjusting and actuating members define passage means between said chambers, said valve means being normally engaged between said adjusting and actuating members to close said passage means and interrupt pressure fluid communication between said chambers, and said actuating means being disengaged from said valve means to open said passage means and establish pressure fluid communication between said chambers upon the movement of said actuating means in excess of the predetermined amount toward its displaced position.

13. The adjusting mechanism according to claim 5, wherein said valve means includes a valve seat on one of said actuating and adjusting members, and a valve member on the other of said actuating and adjusting members normally engaged with said valve seat to interrupt pressure fluid communication between said chambers, one of said valve seat and valve member being disengaged from the other of said valve seat and valve member to establish pressure fluid communication between said chambers upon the movement of said actuating member in excess of the predetermined amount toward its displaced position.

14. The adjusting mechanism according to claim 13, wherein said adjusting and actuating members define passage means between said chambers, said passage means being closed to interrupt pressure fluid communication between said chambers when said valve member is engaged with said valve seat and being opened to establish pressure fluid communication between said chambers upon the disengagement of said valve member and valve seat.

15. The adjusting mechanism according to claim 13, comprising a bore in said actuating member defining said valve seat, said adjusting member including means movable in said bore, passage means in said adjusting member and said included means for connecting said chambers in pressure fluid communication, and said valve member being on said included means normally engaged with said bore to close said passage means and interrupt pressure fluid communication therethrough between said chambers, said bore being disengaged from said valve member to open said passage means and establish pressure fluid communication therethrough between said chambers upon the movement of said actuating member in excess of the predetermined amount toward its displaced position.

16. The adjusting mechanism according to claim 15, comprising another bore in said housing, said one and other chambers being in said other bore, said adjusting member including a first piston slidable in said other bore between said one and other chambers, said actuating member including a second piston slidable in said other bore and defining with said first piston said one chamber, a fluid pressure delivery port in said housing intersecting with said other bore between said first and second pistons in pressure fluid communication with said one chamber said first named bore being in said second piston substantially coaxial with said other bore, an extension on said first piston defining said included means and slidable on said first named bore, a first seal on said extension defining said valve member and normally engaged with said first named bore, a second seal on said extension adjacent to the free end thereof axially spaced from said first seal and engaged with said first named bore at all times, and said passage means being in said first piston and extension having one end connected in pressure fluid communication with said other chamber and the other end thereof connected in pressure fluid communication with said first named bore between said first and second seals, said first named bore being disengaged from said first seal to connect said other end of said passage means in pressure fluid communication with said one chamber upon the movement of said second piston in excess of the predetermined amount toward its displaced position.

17. The adjusting mechanism according to claim 16 wherein said opposed differential areas include a first effective area on said first piston subjected to fluid pressure in said other chamber, a second effective area on said first piston opposed to and smaller than said first area subjected to the fluid pressure in said one chamber, and a third area on the free end of said extension additive to said second area and substantially equal to the difference between said first and second areas subjected at all times to the atmosphere, said first piston being movable in response to the fluid pressure in said one and other chambers acting on said second and first areas, respectively, upon the disengagement of said first seal from said first named bore to adjustably redefine the retracted position of said second piston and to urge said first seal toward reengagement with said first named bore.

References Cited

UNITED STATES PATENTS

| | | | |
|---|---|---|---|
| 2,240,792 | 5/1941 | Liebreich | 60—54.6 |
| 2,474,749 | 6/1949 | Miller | 188—152.13 |
| 2,513,015 | 6/1950 | Fike | 92—75 X |
| 2,571,963 | 10/1951 | Stelzer | 60—54.5 |
| 2,662,617 | 12/1953 | Mougin | 60—54.6 |
| 2,924,945 | 2/1960 | Oswalt | 188—152.13 X |
| 2,928,508 | 3/1960 | Rockwell | 188—152.13 |
| 3,011,315 | 12/1961 | Menichello | 92—75 X |
| 3,171,526 | 3/1965 | Waclawek | 188—152.13 X |

FOREIGN PATENTS

| | | |
|---|---|---|
| 975,361 | 11/1961 | Germany. |
| 1,059,302 | 6/1959 | Germany. |
| 673,245 | 6/1952 | Great Britain. |

MARTIN P. SCHWADRON, *Primary Examiner.*

IRWIN C. COHEN, *Assistant Examiner.*

U.S. Cl. X.R.

92—13, 75; 188—52, 196